US011079980B2

(12) United States Patent
Kawaguchi (10) Patent No.: US 11,079,980 B2
(45) Date of Patent: Aug. 3, 2021

(54) STORAGE MEDIUM STORING IMAGE PROCESSING PROGRAM AND INFORMATION PROCESSING APPARATUS TO INSTALL DRIVER ASSOCIATED WITH USER AND IMAGE PROCESSING DEVICE IDENTIFICATIONS

(71) Applicant: Brother Kogyo Kabushiki Kaisha, Nagoya (JP)

(72) Inventor: Masafumi Kawaguchi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/777,126

(22) Filed: Jan. 30, 2020

(65) Prior Publication Data
US 2020/0241814 A1 Jul. 30, 2020

(30) Foreign Application Priority Data
Jan. 30, 2019 (JP) .............................. JP2019-013774

(51) Int. Cl.
*G06F 3/12* (2006.01)
(52) U.S. Cl.
CPC .......... *G06F 3/1225* (2013.01); *G06F 3/1204* (2013.01); *G06F 3/1228* (2013.01); *G06F 3/1255* (2013.01)
(58) Field of Classification Search
None
See application file for complete search history.

(56) References Cited

U.S. PATENT DOCUMENTS

| 7,619,795 B2 * | 11/2009 | Masuda | G02B 26/124 |
| | | | 359/196.1 |
| 2008/0178200 A1 | 7/2008 | Kaneko et al. | |
| 2009/0201547 A1 * | 8/2009 | Noguchi | G06F 3/1228 |
| | | | 358/1.15 |

(Continued)

FOREIGN PATENT DOCUMENTS

| JP | 2003-150348 A | 5/2003 |
| JP | 2008-123388 A | 5/2008 |

(Continued)

*Primary Examiner* — Haris Sabah
(74) *Attorney, Agent, or Firm* — Banner & Witcoff, Ltd.

(57) ABSTRACT

An image processing program includes a set of program instructions executable on an information processing apparatus. The set of program instructions, when executed by a controller, causes the information processing apparatus to perform: determining whether a driver is installed on the information processing apparatus, the driver being for controlling an image processing device that becomes a target of an execution instruction for image processing by the image processing program, the image processing device being among a plurality of image processing devices configured to communicate with the information processing apparatus through a network; in response to determining that the driver is not installed on the information processing apparatus, installing the driver on the information processing apparatus; and transmitting an execution instruction for image processing through the installed driver to an image processing device that is controllable by the installed driver and that is selected in the image processing program.

11 Claims, 7 Drawing Sheets

(56) References Cited

U.S. PATENT DOCUMENTS

| | | | |
|---|---|---|---|
| 2010/0094979 A1* | 4/2010 | Azami | G06F 3/1225 709/221 |
| 2014/0233050 A1* | 8/2014 | Kishida | G06F 3/1204 358/1.13 |
| 2015/0199157 A1* | 7/2015 | Xiao | G06F 3/1236 358/1.15 |
| 2015/0378649 A1* | 12/2015 | Akiyama | G06F 3/1225 358/1.15 |
| 2016/0274825 A1* | 9/2016 | Minegishi | G06F 3/1257 |
| 2017/0372084 A1* | 12/2017 | Murashita | H04L 9/0822 |

FOREIGN PATENT DOCUMENTS

| | | |
|---|---|---|
| JP | 2009-100024 A | 5/2009 |
| JP | 2010-226578 A | 10/2010 |

\* cited by examiner

MANAGEMENT TABLE 21

| USER ID | MODEL NAME | IP ADDRESS |
|---|---|---|
| SUZUKI | MFP-A | 192.168.00.11 |
| SUZUKI | MFP-C | 192.168.00.33 |
| YAMADA | MFP-A | 192.168.00.11 |
| : | : | : |
| : | : | : |
| : | : | : |

22

| PRINTER DRIVER |
|---|
| MFP-A-DR |
| MFP-B-DR |
| MFP-C-DR |
| MFP-D-DR |
| : |
| : |

FIG. 2B

MANAGEMENT TABLE 21

| USER ID | MODEL NAME | IP ADDRESS |
|---|---|---|
| SUZUKI | MFP-A | 192.168.00.11 |
| SUZUKI | MFP-C | 192.168.00.33 |
| YAMADA | MFP-A | 192.168.00.11 |
| TANAKA | MFP-B | 192.168.00.22 |
| TANAKA | MFP-D | 192.168.00.44 |
| : | : | : |

22

| PRINTER DRIVER |
|---|
| MFP-A-DR |
| MFP-B-DR |
| MFP-C-DR |
| MFP-D-DR |
| : |
| : |

STORAGE MEDIUM STORING IMAGE PROCESSING PROGRAM AND INFORMATION PROCESSING APPARATUS TO INSTALL DRIVER ASSOCIATED WITH USER AND IMAGE PROCESSING DEVICE IDENTIFICATIONS

CROSS REFERENCE TO RELATED APPLICATIONS

This application claims priority from Japanese Patent Application No. 2019-013774 filed Jan. 30, 2019. The entire content of the priority application is incorporated herein by reference.

TECHNICAL FIELD

This disclosure relates to technology for installing a driver that controls an image processing device.

BACKGROUND

Conventionally, in an information processing apparatus that controls an image processing device, a driver for controlling the image processing device is installed. For example, it is disclosed that a peripheral device suitable for the place of use is assigned to a terminal and a driver for the assigned peripheral device is installed.

SUMMARY

According to one aspect, this specification discloses a non-transitory computer-readable storage medium storing an image processing program including a set of program instructions executable on an information processing apparatus including a controller. The set of program instructions, when executed by the controller, causes the information processing apparatus to perform: determining whether a driver is installed on the information processing apparatus, the driver being for controlling an image processing device that becomes a target of an execution instruction for image processing by the image processing program, the image processing device being among a plurality of image processing devices configured to communicate with the information processing apparatus through a network; in response to determining that the driver is not installed on the information processing apparatus, installing the driver on the information processing apparatus; and transmitting an execution instruction for image processing through the installed driver to an image processing device that is controllable by the installed driver and that is selected in the image processing program.

According to another aspect, this specification also discloses an information processing apparatus configured to control an image processing device to perform image processing by using an installed image processing program. The information processing apparatus includes a controller and a memory storing instructions. The instructions, when executed by the controller, cause the information processing apparatus to perform: determining whether a driver is installed on the information processing apparatus, the driver being for controlling an image processing device that becomes a target of an execution instruction for image processing by the image processing program, the image processing device being among a plurality of image processing devices configured to communicate with the information processing apparatus through a network; in response to determining that the driver is not installed on the information processing apparatus, installing the driver on the information processing apparatus; and transmitting an execution instruction for image processing through the installed driver to an image processing device that is controllable by the installed driver and that is selected in the image processing program.

According to still another aspect, this specification also discloses an information processing apparatus configured to control an image processing device to perform image processing by using an installed image processing program. The information processing apparatus includes: means for determining whether a driver is installed on the information processing apparatus, the driver being for controlling an image processing device that becomes a target of an execution instruction for image processing by the image processing program, the image processing device being among a plurality of image processing devices configured to communicate with the information processing apparatus through a network; means for, in response to determining that the driver is not installed on the information processing apparatus, installing the driver on the information processing apparatus; and means for transmitting an execution instruction for image processing through the installed driver to an image processing device that is controllable by the installed driver and that is selected in the image processing program.

The technology disclosed in this specification may be realized by various modes and, for example, may be realized by an information processing apparatus in which an image processing program is installed, an install method, a storage medium storing an image processing program, and so on.

BRIEF DESCRIPTION OF THE DRAWINGS

Embodiments in accordance with this disclosure will be described in detail with reference to the following figures wherein.

DETAILED DESCRIPTION

In some cases, the information processing apparatus stores, in addition to a driver, a generic image processing program for causing an image processing device selected by a user from among a plurality of image processing devices to perform image processing through a network. In addition to the image processing program, a driver for controlling the selected image processing device needs to be installed in order to cause the image processing device to perform image processing. That is, if a driver for controlling the image processing device is not installed on the information processing apparatus when an execution instruction of image processing is given to the selected image processing device, the execution instruction of image processing cannot be transmitted to the selected image processing device.

In view of the foregoing, an example of an object of this disclosure is to provide technology of appropriately transmitting an execution instruction of image processing to an image processing device selected in an image processing program.

An information processing apparatus according to some aspects of this disclosure will be described while referring to the attached drawings.

Main Electrical Configuration of Information Processing Apparatus

The main electrical configuration of the information processing apparatus according to an embodiment of this disclosure will be described while referring to FIG. 1.

Figure 1:
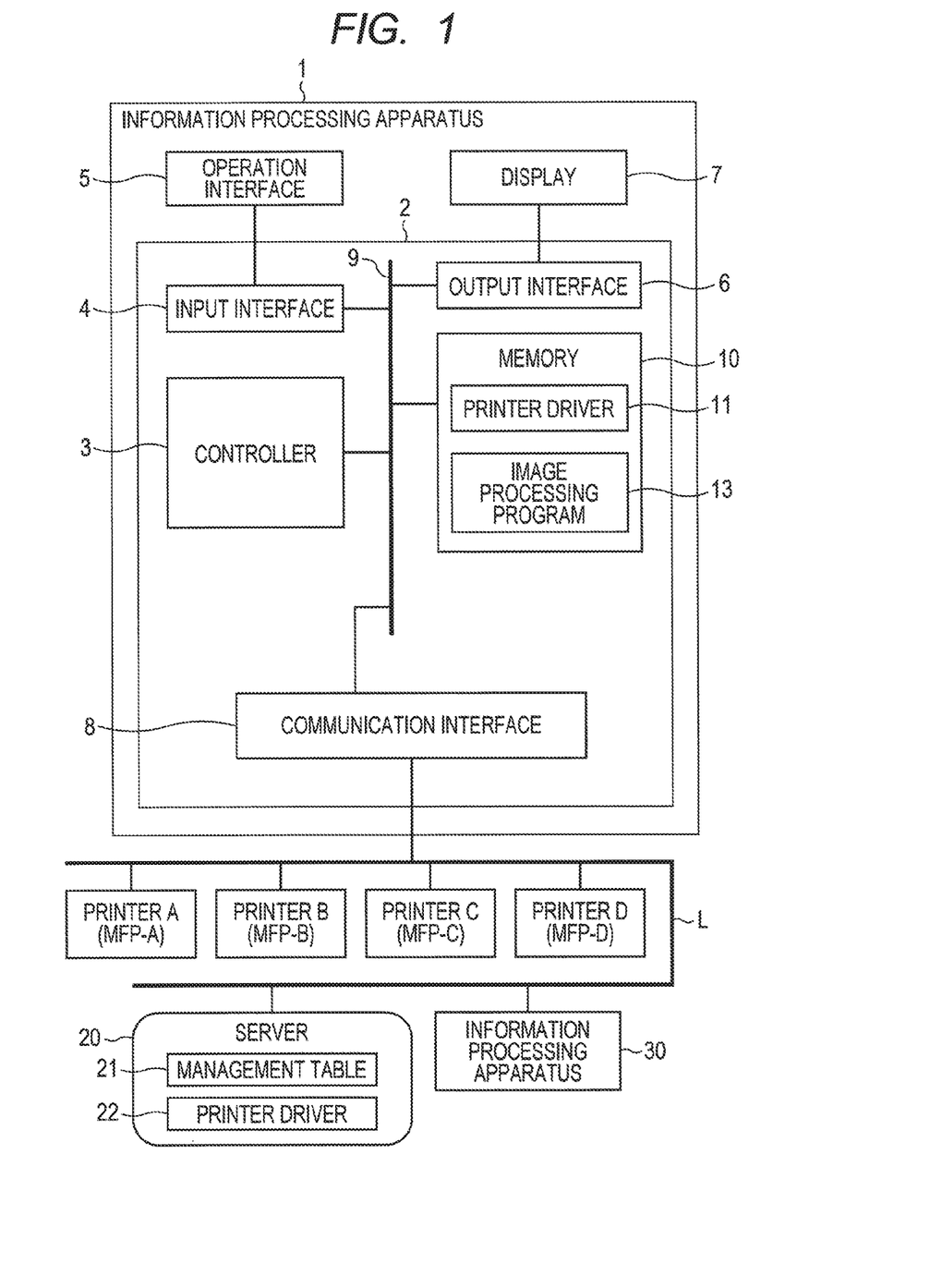
FIG. 1 is an explanatory diagram showing the main electrical configuration of an information processing apparatus 1 according to an embodiment of this disclosure.

As shown in FIG. 1, the information processing apparatus 1 according to the embodiment includes an information processing apparatus main body 2, an operation interface 5, and a display 7. The information processing apparatus 1 is, for example, a PC (Personal Computer) such as a desktop PC, a notebook PC, and a tablet PC, and may be of any size and shape. The information processing apparatus 1 may be a portable device such as a smartphone. The operation interface 5 is a device to which a user inputs information, and includes a pointing device such as a mouse and a keyboard. The operation interface 5 may include a pointing device such a touch panel and a touch pad. The display 7 displays information inputted through the operation interface 5, the contents that are processed by the information processing apparatus main body 2, and so on. The display 7 is a display device including a liquid display panel, an organic EL panel, and so on.

The information processing apparatus main body 2 includes the controller 3, a memory 10, an input interface 4, an output interface 6, and a communication interface 8. The controller 3 is connected to the memory 10, the input interface 4, the output interface 6, and the communication interface 8 through a bus 9. The operation interface 5 is electrically connected to the input interface 4, and the display 7 is electrically connected to the output interface 6. The communication interface 8 is an interface for connecting to a LAN (Local Area Network), and is connected to a LAN network L. A printer A of a model name MFP-A, a printer B of a model name MFP-B, a printer C of a model name MFP-C, a printer D of a model name MFP-D, an information processing apparatus 30, and the server 20 are connected to the LAN network L such that each apparatus performs communication with one another. Different IP (Internet Protocol) addresses are assigned to the printer A to the printer D (see FIGS. 2A and 2B). The LAN network L may be a wired LAN or a wireless LAN.

In the following descriptions, when a common matter in the printer A to the printer D is described, it may be simply referred to as "printer". Further, when a common matter in the information processing apparatus 1 and the information processing apparatus 30 is described, it may be simply referred to as "information processing apparatus". The LAN network L is a non-limiting example of a network, and the printers A to D are a non-limiting example of a plurality of image processing devices.

The controller 3 includes a CPU (Central Processing Unit) (not shown). The controller 3 performs overall control of the information processing apparatus 1 and controls the printer. The memory 10 includes a ROM (Read Only Memory), a RAM (Random Access Memory), an SDRAM (Synchronous Dynamic Random Access Memory), and a HDD (Hard Disc Drive) (all of which are not shown). The memory 10 stores the printer driver 11 such that the printer driver 11 can be uninstalled or updated (reinstalled). The memory 10 further stores an image processing program 13 such that the image processing program 13 can be uninstalled or updated (reinstalled). That is, the image processing program 13 is an image processing program that is installed on the information processing apparatus 1 having the controller 3.

The image processing program 13 is an application program for executing processing relating to image processing, such as a function of generating, by the controller 3, print data for instructing the image processing device to perform printing and a function of storing scan data read by the image processing device in a particular storage area. The image processing program 13 is configured to be common to a plurality of models of image processing devices and, when performing a model-dependent control that depends on a model of the image processing device, the controller 3 executes image processing in cooperation with the image processing program 13 and a device driver such as the printer driver 11. That is, when executing print processing, the controller 3 performs file selection of a print target and print setting in the image processing program 13, and transmits the selected file and set print setting information to the printer driver 11 of the selected image processing device. The printer driver 11 generates print data based on the file received from the image processing program 13 and the received print setting, and transmits a print instruction including the generated print data to the selected image processing device. That is, the image processing program 13 is configured to execute processing of transmitting an execution instruction to the printer through the installed printer driver 11 to cause the printer to perform image processing.

The image processing program 13 of this embodiment is further configured to execute processing of downloading an installer package for installing the printer driver 11 from the server 20 and processing of executing an execution file (exe file) included in the downloaded installer package to install the printer driver 11 included in the installer package. The image processing function using scan data that is performed by the image processing program 13 of this embodiment does not include model-dependent processing of the image processing device. Thus, it is only necessary to store, in the memory 10, a program for transmitting a scan instruction to an image processing device having a scanner function and for receiving scan data from the image processing device, and it is unnecessary to separately install a scanner driver for each model of the selected image processing device. In other words, it can be said that the image processing program 13 of this embodiment performs image processing through a device driver for a print function, and performs image processing not through a device driver for a scan function. The information processing apparatus 30 has the same configuration and functions as the information processing apparatus 1. Alternatively, depending on the type of the image processing device, the image processing program 13 may perform image processing through a device driver for a scan function.

Main Electrical Configuration and Function of Server 20

The main electrical configuration and function of the server 20 will be described while referring to FIGS. 1, 2A and 2B.

Figure 2A:
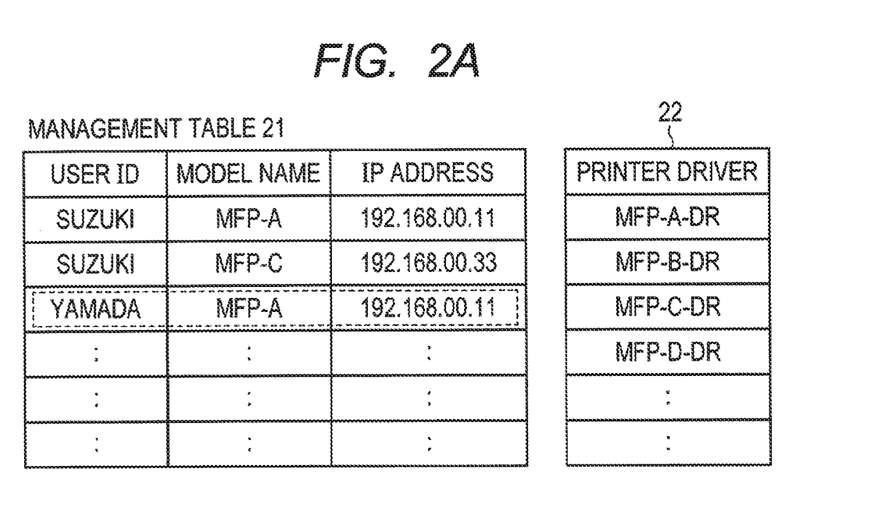
FIGS. 2A and 2B are explanatory diagrams showing a management table 21 and a printer driver 22 stored in a server 20 shown in FIG. 1.
Figure 2B:
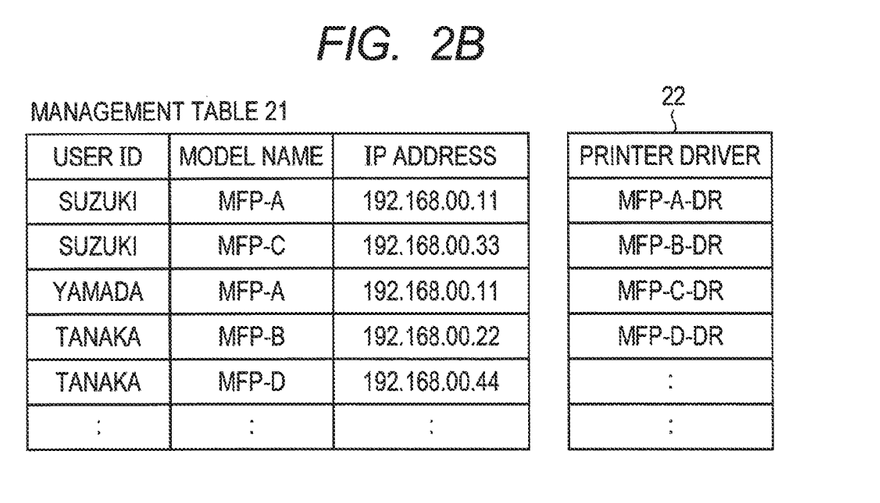

As shown in FIGS. 1, 2A and 2B, the server 20 stores the management table 21 and a plurality of printer drivers 22. As shown in FIGS. 2A and 2B, the management table 21 includes a user ID for identifying a user of an information processing apparatus configured to communicate with the server 20, a model name for identifying a printer that can be controlled by the information processing apparatus, and an IP address of the printer, in association with one another. In the examples shown in FIGS. 2A and 2B, the user ID "YAMADA", the model name of the printer A "MFP-A", and the IP address of the printer A "192.168.00.11" are stored (registered) in association with one another.

As the plurality of printer drivers 22, the printer driver for each model is stored so as to be read out. In the examples shown in FIGS. 2A and 2B, as the printer driver 22, the printer driver "MFP-A-DR" for the model name "MFP-A", the printer driver "MFP-B-DR" for the model name "MFP-B", the printer driver "MFP-C-DR" for the model name "MFP-C", and the printer driver "MFP-D-DR" for the model name "MFP-D" are stored such that each printer driver can be read out. For example, in order to install the printer driver for the printer A, the "MFP-A-DR" that is the printer driver for the model name "MFP-A" is read out.

The user ID is a non-limiting example of user information, and each of the model name and the IP address is a non-limiting example of image processing device information.

The server 20 stores (registers) each of the user ID, the model name, and the IP address transmitted from the information processing apparatus in the management table 21 to update the management table 21. Further, the server 20 transmits, to the information processing apparatus, the model name and the IP address associated with the user ID received from the information processing apparatus. Further, in a case where another user ID associated with the model name and the IP address received from the information processing apparatus exists in the management table 21, the server 20 transmits the model name and the IP address associated with that user ID to the information processing apparatus. Further, in response to receiving a request for transmitting a printer driver from the information processing apparatus, the server 20 reads out the requested printer driver from the printer driver 22 and transmits the read printer driver to the information processing apparatus that has sent the request.

Example of Installation of Printer Driver Part 1

Next, a communication procedure for installing a printer driver from the server 20 by performing communication between the information processing apparatus 1 and the server 20 will be described while referring to FIGS. 2A, 3A, and 4.

Here, it is assumed that the user ID of the user of the information processing apparatus 1 is "YAMADA", and the user ID of the user of the information processing apparatus 30 is "SUZUKI". It is also assumed that each of the information processing apparatus 1 and the information processing apparatus 30 is configured to transmit an execution instruction for image processing to the printers A to D. It is also assumed that, as shown in FIG. 2A, in the management table 21 of the server 20, the user ID "SUZUKI", the model name "MFP-A", and the IP address "192.168.00.11" are stored in association with one another, and the user ID "SUZUKI", the model name "MFP-C" of the printer C, and the IP address "192.168.00.33" of the printer C are stored in association with one another.

It is also assumed that, in the printer driver 22 of the server 20, the printer driver "MFP-A-DR" of the printer A, the printer driver "MFP-B-DR" of the printer B, the printer driver "MFP-C-DR" of the printer C, and the printer driver "MFP-D-DR" of the printer D are stored such that each printer driver can be read out.

When the user of the information processing apparatus 1 starts up the image processing program 13 (FIG. 1), the information processing apparatus 1 displays a user interface (hereinafter, abbreviated as "UI") shown in FIG. 4A on the display 7 (FIG. 1). Then, when the user selects a button B1 labeled as "search for device" that is displayed on the UI, the image processing program 13 searches for a printer that communicates with the information processing apparatus 1 through a LAN network L (FIG. 1), and displays image processing device information M1 of the found printer on the UI. In the example shown in FIG. 4B, the printer A (FIG. 1) is found, and the image processing device information M1 having the model name "MFP-A" and the IP address "192.168.00.11" of the printer A is displayed. An icon P1 displayed on the UI is an icon that is displayed when the found printer has a print function and that is selected to perform print processing, and an icon P2 is an icon that is displayed when the found printer has a scan function and that is selected to perform scan processing.

Figure 3A:
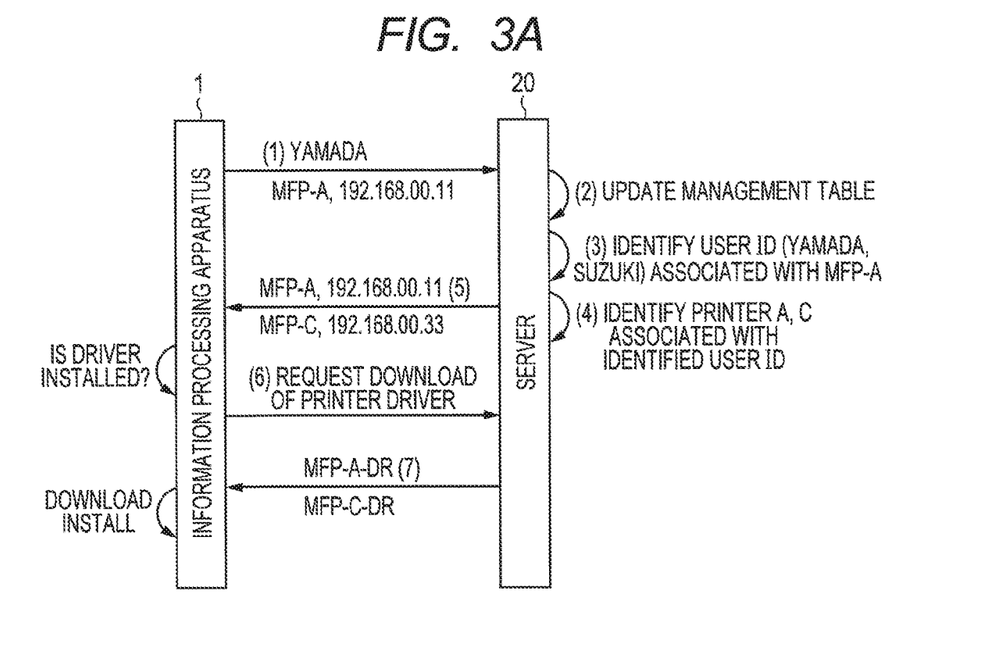
FIG. 3A is an explanatory diagram showing a communication procedure between the information processing apparatus 1 and the server 20.

Then, as shown in FIG. 3A, the information processing apparatus 1 transmits, to the server 20, the user ID "YAMADA" that is user information and the model name of the printer A "MFP-A" and the IP address "192.168.00.11" of the printer A that are image processing device information ((1) in FIG. 3A). Subsequently, the server 20 stores (registers), in the management table 21, the user ID "YAMADA", the model name "MFP-A", and the IP address "192.168.00.11" received from the information processing apparatus 1, thereby updating the management table 21 ((2) in FIG. 3A). Subsequently, the server 20 identifies the user IDs "YAMADA" and "SUZUKI" that are stored in association with the model name "MFP-A" and the IP address "192.168.00.11" of image processing device information in the management table 21 ((3) in FIG. 3A). Subsequently, the server 20 identifies the model name "MFP-A", the IP address "192.168.00.11" and the model name "MFP-C", the IP address "192.168.00.33" that are image processing device information associated with the identified user ID "YAMADA" and "SUZUKI" ((4) in FIG. 3A). Subsequently, the server 20 transmits the identified image processing device information to the information processing apparatus 1 ((5) in FIG. 3A).

Upon receiving the user information and the image processing device information from the information processing apparatus, the server 20 updates the management table 21 and then identifies user information associated with the received image processing device information. With this operation, the user information including user information having transmitted image processing device information is identified reliably. And, the image processing device information associated with the identified user information is transmitted to the information processing apparatus. That is, the controller 3 of the information processing apparatus 1 executes reception processing of receiving the image processing device information associated with user information transmitted to the server 20, through the LAN network L, from the server 20. In the management table 21, the image processing device information "MFP-A" and "192.168.00.11" transmitted from the information processing apparatus 1 to the server 20 are also associated with the user ID "SUZUKI" identifying the user of the information processing apparatus 30. Thus, it is presumed that the user of the information processing apparatus 1 and the user of the information processing apparatus 30 are located in a distance that the users use the same printer A, in other words, in a relatively short distance. The printer C that is presumed to be used by the user of the information processing apparatus 30 is likely to be used by the user of the information processing apparatus 1. Hence, the server 20 transmits the model name "MFP-C" and the IP address "192.168.00.33" that are the image processing device information of the printer C, together with the image processing device information of the printer A, to the information processing apparatus 1.

The information processing apparatus 1 receives the image processing device information of the printer A and the printer C from the server 20. That is, the controller 3 of the information processing apparatus 1 executes reception processing of receiving the image processing device information associated with all the user IDs including other user IDs that are associated with the same image processing device information as the image processing device information transmitted to the server 20, through the LAN network L, from the server 20. Subsequently, the information processing apparatus 1 determines whether each printer driver of the printer A and the printer C of which image processing device information has been received is already installed. Here, the printer C is not the printer A selected by the user, but it is likely to be used by the user. Hence, it is not only determined whether the printer driver of the printer A is installed, but also it is determined whether the printer driver of the printer C is installed. In response to determining that neither printer driver is installed, the controller 3 transmits, to the server 20, a signal for requesting download of the printer drivers of the models corresponding to the model name "MFP-A" of the printer A and the model name "MFP-C" of the printer C ((6) in FIG. 3A).

Subsequently, in response to receiving the signal for requesting download of the printer drivers, the server 20 reads out, from the printer driver 22, the printer drivers "MFP-A-DR" and "MFP-C-DR" of the model names "MFP-A" and "MFP-C" indicated by that signal, and transmits the read printer drivers to the information processing apparatus 1 ((7) in FIG. 3A). Specifically, the server 20 transmits installer packages for installing the printer drivers "MFP-A-DR" and "MFP-C-DR" to the information processing apparatus 1.

Upon downloading the installer packages from the server 20, the information processing apparatus 1 automatically executes execution files included in the installer packages, and automatically installs the printer drivers "MFP-A-DR" and "MFP-C-DR" included in the installer packages. With this operation, the user of the information processing apparatus 1 can use not only the printer A the user originally wishes to use but also the printer C that is presumed to be placed near the user.

In another case where the image processing device information of the printer C is not stored (registered) in the management table 21, the server 20 transmits only the image processing device information of the printer A to the information processing apparatus 1. In response to determining that the printer driver of the printer A is not installed, the information processing apparatus 1 transmits a signal for requesting download of the printer driver of the model name "MFP-A" to the server 20. In response to receiving the signal for requesting download of the printer driver of the model name "MFP-A", the server 20 transmits an installer package for installing the printer driver "MFP-A-DR" of the model name "MFP-A" to the information processing apparatus 1. Then, the information processing apparatus 1 downloads the installer package, and installs the printer driver "MFP-A-DR". With this operation, the user of the information processing apparatus 1 can use the printer A the user wishes to use.

Example of Installation of Printer Driver Part 2

Next, another example of a communication procedure for installing a printer driver from the server 20 by performing communication between the information processing apparatus 1 and the server 20 will be described. Here, installation of the printer driver in a case where the user of the information processing apparatus switches to another information processing apparatus (for example, switch to a new PC) will be described while referring to FIGS. 2B and 3B.

Here, it is assumed that the "TANAKA" of the information processing apparatus 1 has switched from the information processing apparatus 1 to another information processing apparatus 40. The main electrical configuration and function of the information processing apparatus 40 are the same as those of the information processing apparatus 1. The information processing apparatus 40 is connected to the LAN network L. It is assumed that, when the user "TANAKA" used the information processing apparatus 1, the user "TANAKA" used the printer B and the printer D. As shown in FIG. 2B, in the management table 21, the user ID "TANAKA", the model name of the printer B "MFP-B", and the IP address of the printer B "192.168.00.22" are stored (registered) in association with one another, and the user ID "TANAKA", the model name of the printer D "MFP-D", and the IP address of the printer D "192.168.00.44" are stored (registered) in association with one another.

That is, the information processing apparatus 40 is configured to communicate, through the LAN network L, with the server 20 that stores a user ID and image processing device information identifying the printer that has been selected by the image processing program 13 operated by the user identified by that user ID, in association with each other.

When the user "TANAKA" of the information processing apparatus 40 sets the user ID to "TANAKA" (that is, the same user ID as before) in the information processing apparatus 40, starts up the image processing program, and selects the button B1 displayed on the UI, a printer connected to the information processing apparatus 40 is searched for and image processing device information M1 of the found printer is displayed on the UI. Here, it is assumed that the printer B is found and that the model name "MFP-B" and the IP address "192.168.00.22" are displayed on the UI as the image processing device information M1 of the printer B. The information processing apparatus 40 transmits the user ID "TANAKA", the model name of the printer B "MFP-B", and the IP address of the printer B "192.168.00.22" to the server 20 ((1) in FIG. 3B). That is, when a printer is selected in the image processing program 13, the information processing apparatus 40 executes transmission processing of transmitting the image processing device information identifying the selected printer and the user ID identifying the user operating the image processing program 13, through the LAN network L, to the server 20.

Figure 3B:
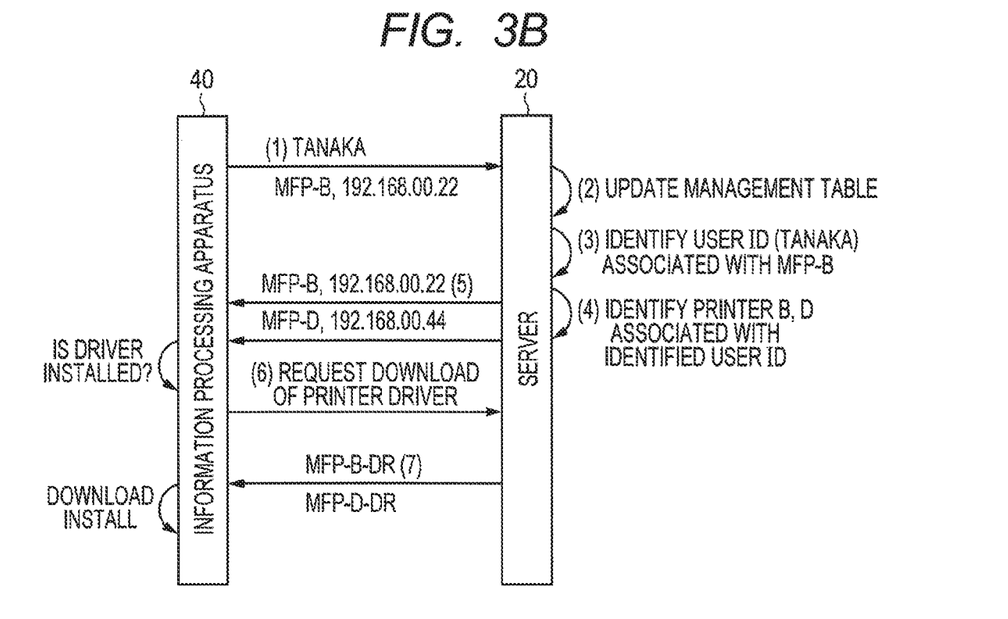
FIG. 3B is an explanatory diagram showing a communication procedure between an information processing apparatus 40 and the server 20.

The server 20 receives the user ID "TANAKA", the model name of the printer B "MFP-B", and the IP address of the printer B "192.168.00.22" from the information processing apparatus 40, and updates the management table 21 ((2) in FIG. 3B). Subsequently, the server 20 identifies the user ID "TANAKA" associated with the model name "MFP-B" and the IP address "192.168.00.22" in the management table 21 ((3) in FIG. 3B), and identifies the model name "MFP-B", the IP address "192.168.00.22" and the model name "MFP-D", the IP address "192.168.00.44" that are image processing device information associated with the identified user ID "TANAKA" ((4) in FIG. 3B). Subsequently, the server 20 transmits the identified image processing device information "MFP-B", "192.168.00.22" and "MFP-D", "192.168.00.44" to the information processing apparatus 40 ((5) in FIG. 3B).

The information processing apparatus 40 receives the image processing device information of the printer B and the printer D transmitted by the server 20. That is, the information processing apparatus 40 executes reception processing of receiving the model name associated with the user ID transmitted by the above-described transmission processing, through the LAN network L, from the server 20. Subsequently, the information processing apparatus 40 determines whether each printer driver of the printer B and the printer D identified by the received image processing device information is already installed and, in response to determining that neither printer driver is installed, transmits a signal for requesting download of the printer drivers corresponding to the model name of the printer B "MFP-B" and the model name of the printer D "MFP-D" to the server 20 ((6) in FIG. 3B). Subsequently, in response to receiving the signal for requesting download of the printer drivers, the server 20 reads out, from the printer driver 22, the printer drivers "MFP-B-DR" and "MFP-D-DR" of "MFP-B" and "MFP-D" indicated by that signal, and transmits the read printer driver to the information processing apparatus 40 ((7) in FIG. 3B). Specifically, the server 20 transmits installer packages for installing the printer drivers "MFP-B-DR" and "MFP-D-DR" to the information processing apparatus 40.

Upon downloading the installer packages from the server 20, the information processing apparatus 40 executes execution files included in the installer packages to install the printer drivers "MFP-B-DR" and "MFP-D-DR" included in the installer packages. With this operation, the user of the information processing apparatus 40 can use the printer B and the printer D without performing work of manually and separately downloading the installer package of each printer driver of the printer B and the printer D from the server 20 and installing each printer driver included in each installer package.

That is, even when the user of the information processing apparatus has changed his or her information processing apparatus, the user can easily create the same printer environment as the information processing apparatus that was previously used by the user by setting his or her user ID to the new information processing apparatus and selecting the printer he or she wishes to use.

Processing By Image Processing Program 13

Next, control processing in which the controller 3 starts up and executes the image processing program 13 will be described while referring to FIGS. 5 to 7.

In the following description, the information processing apparatus 1 performs communication with the server 20. The controller 3 executes installation processing and print processing in accordance with the image processing program 13 (FIG. 1). Further, "step" is abbreviated as "S".

Figure 4A:
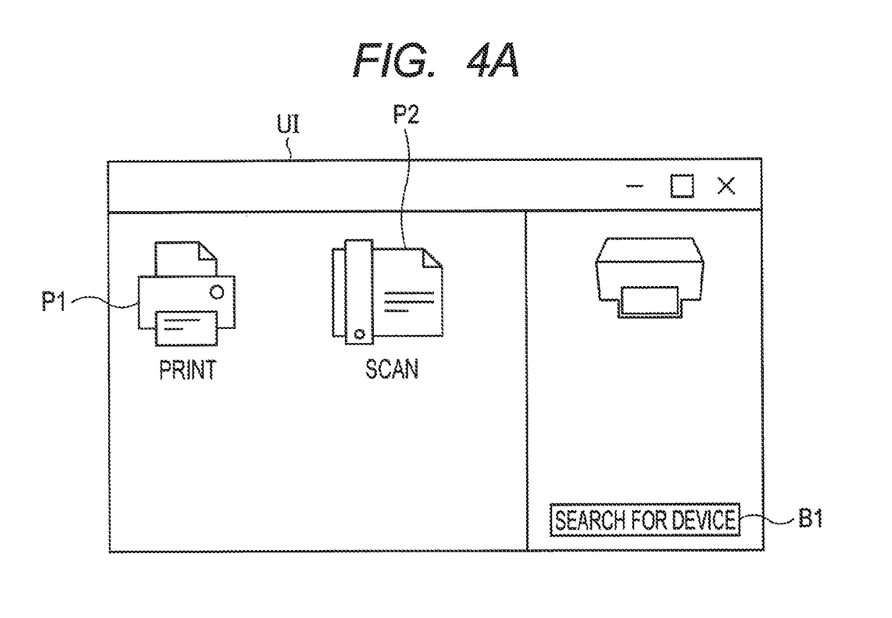
FIGS. 4A and 4B are explanatory diagrams showing a user interface displayed on a display 7 shown in FIG. 1.
Figure 5:
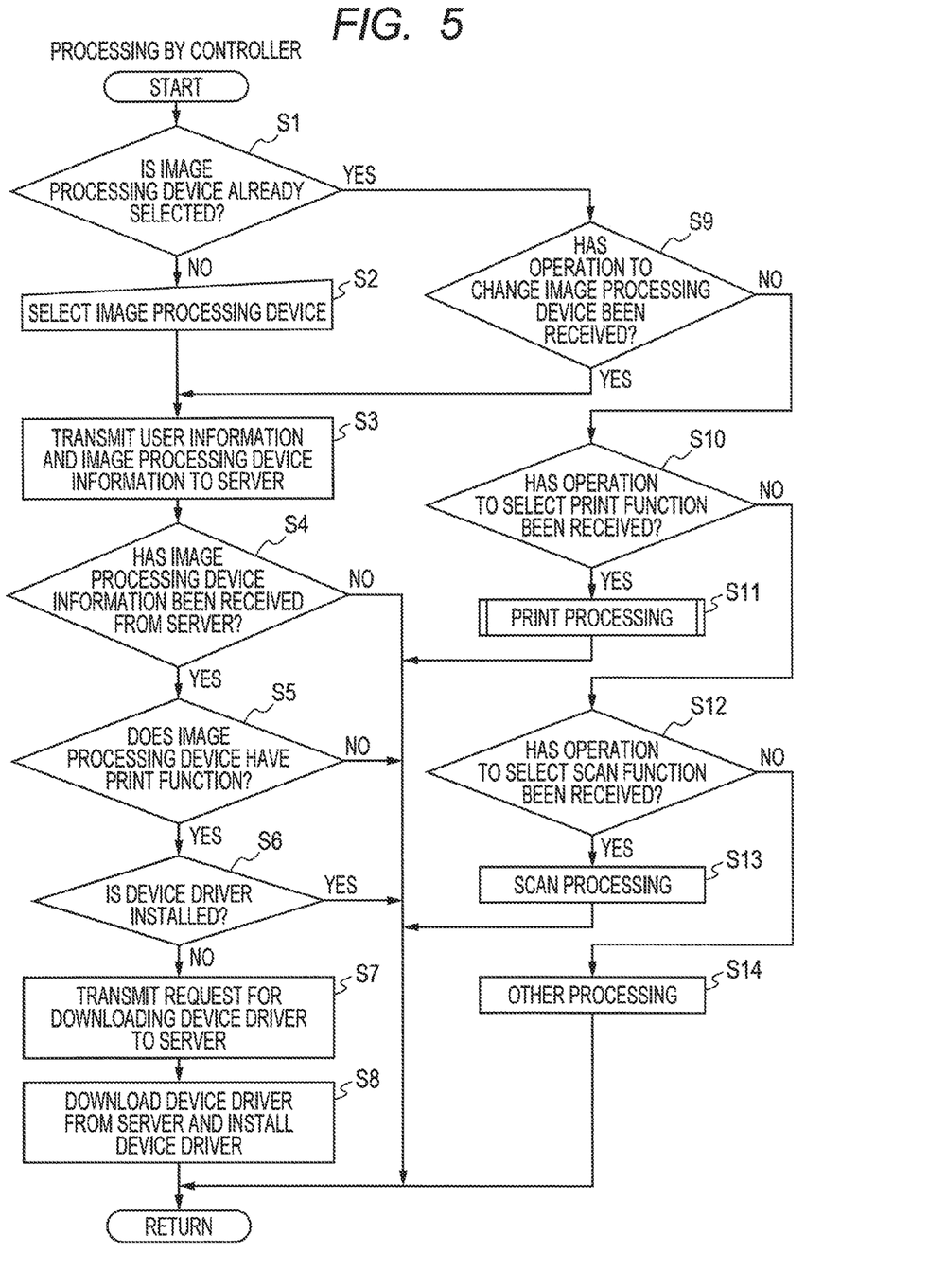
FIG. 5 is a flowchart showing the flow of processing executed by a controller 3 of the information processing apparatus 1 shown in FIG. 1.
Figure 6:
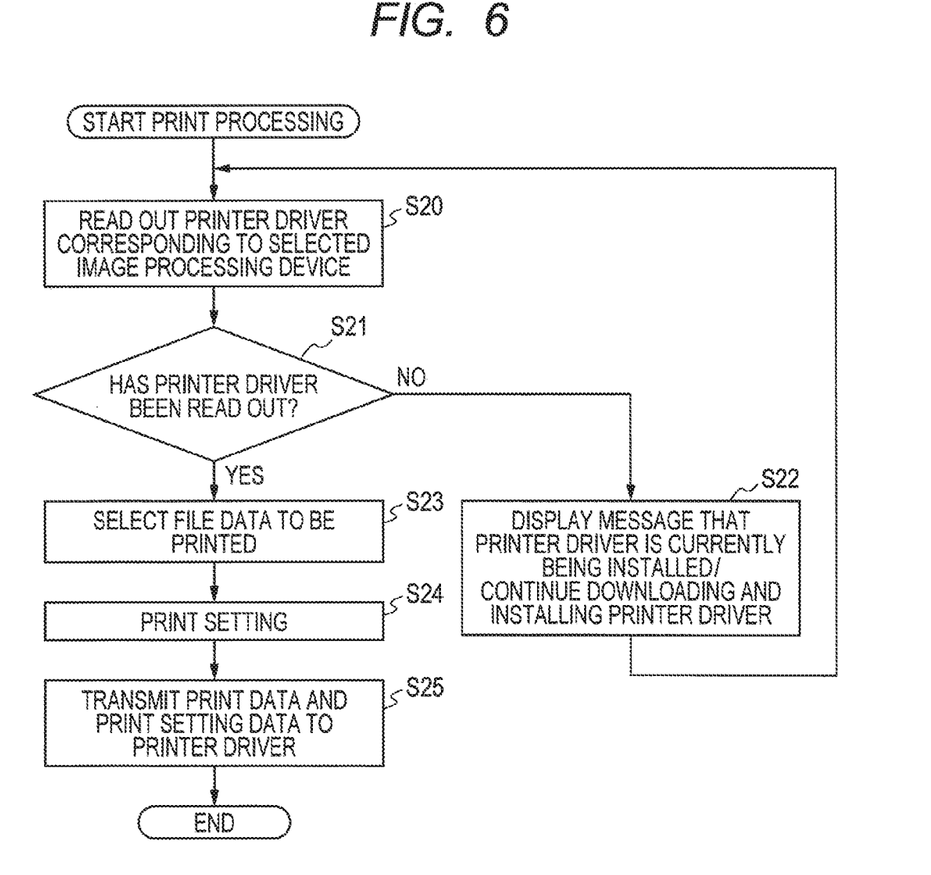
FIG. 6 is a flowchart showing the flow of print processing in FIG. 5.

Upon starting up the image processing program 13 (FIG. 1) by the user, a flowchart shown in FIG. 5 is started. When the image processing program 13 starts up, first, the controller 3 determines whether an image processing device has already been selected in the image processing program 13 (S1). In a case where the image processing program 13 is installed on the information processing apparatus 1 and the image processing program 13 is started up for the first time, no image processing device has been selected yet (S1: No). In a case where the image processing program 13 has been started up and an image processing device has been selected by a user's operation at least once in the past, it is determined that an image processing device is already selected (S1: Yes). An image processing device is selected by operating the button B1 (FIG. 4A) on the UI and by selecting one image processing device from among image processing devices connected to the LAN network L. Upon receiving an operation on the button B1 (FIG. 4A) on the UI, the controller 3 searches for image processing devices connected to the LAN network L and displays a list screen of the found image processing devices on the display 7.

Figure 4B:
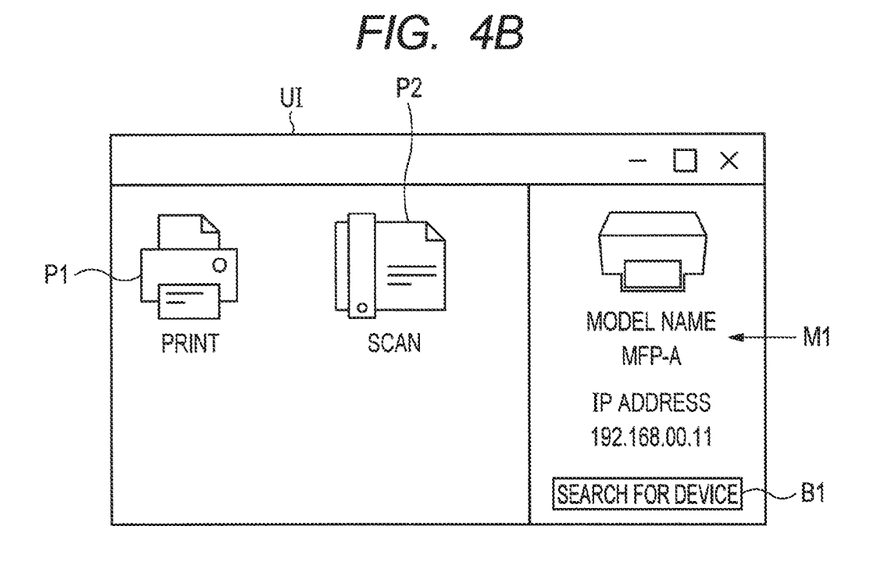

When the user selects one image processing device from the list of image processing devices displayed on the display 7, the UI screen shown in FIG. 4A is updated. For example, when the printer A is selected form the list of image processing devices, as shown in FIG. 4B, the image processing device information M1 is updated to include information of the printer A. The image processing program 13 stores the selected image processing device information M1 in the memory 10. In a case where the image processing device information M1 is stored in the memory 10, the image processing device information M1 is overwritten (updated) with the newly-selected image processing device information. That is, the image processing device information M1 selected the last time is stored in the memory 10. In other words, it can be said that, in S1 of FIG. 5, it is determined whether the image processing device information M1 is stored in the memory. In response to determining that the image processing device has already been selected (S1: Yes), the display 7 displays the UI including the image processing device information M1 relating to the selected image processing device (see FIG. 4B). In response to determining that no image processing device has been selected yet (S1: No), the display 7 displays the UI shown in FIG. 4A.

Here, in response to determining that no image processing device has been selected yet (S1: No), the controller 3 stands by until the user selects an image processing device and, when the user selects an image processing device, receives that selection (S2). That is, in S2, the button B1 in FIG. 4A is selected and one image processing device is selected from among the image processing devices connected to the LAN network L, and thereby selection of the image processing device is received.

Even when the controller 3 determines that an image processing device has been already selected (S1: Yes), the user can change the selected image processing device. Upon receiving a user's operation to the button B1 in FIG. 4B, the controller 3 searches for image processing devices connected to the LAN network L. The user newly selects one image processing device from the list of found image processing devices, and thereby the image processing device information M1 is changed to the selected image processing device. In S9, it is determined whether an image processing device different from the selected image processing device is newly selected. In response to determining that such image processing device is newly selected (S9: Yes), the processing moves to S3.

Subsequently, the controller 3 transmits, to the server 20, user information and image processing device information of the selected image processing device (S3).

For example, in a case where the user information is the user ID of the user who has logged onto the information processing apparatus 1 and the image processing device information is the model name of the device and the IP address of the device, the controller 3 transmits the user ID and the model name and the IP address of the device to the server 20 (S3). For example, in a case where the user ID is "YAMADA" and the selected image processing device is the printer A of the model name "MFP-A", the controller 3 transmits the user ID "YAMADA", the model name "MFP-A", and the IP address "192.168.00.11" to the server 20.

Figure 7:
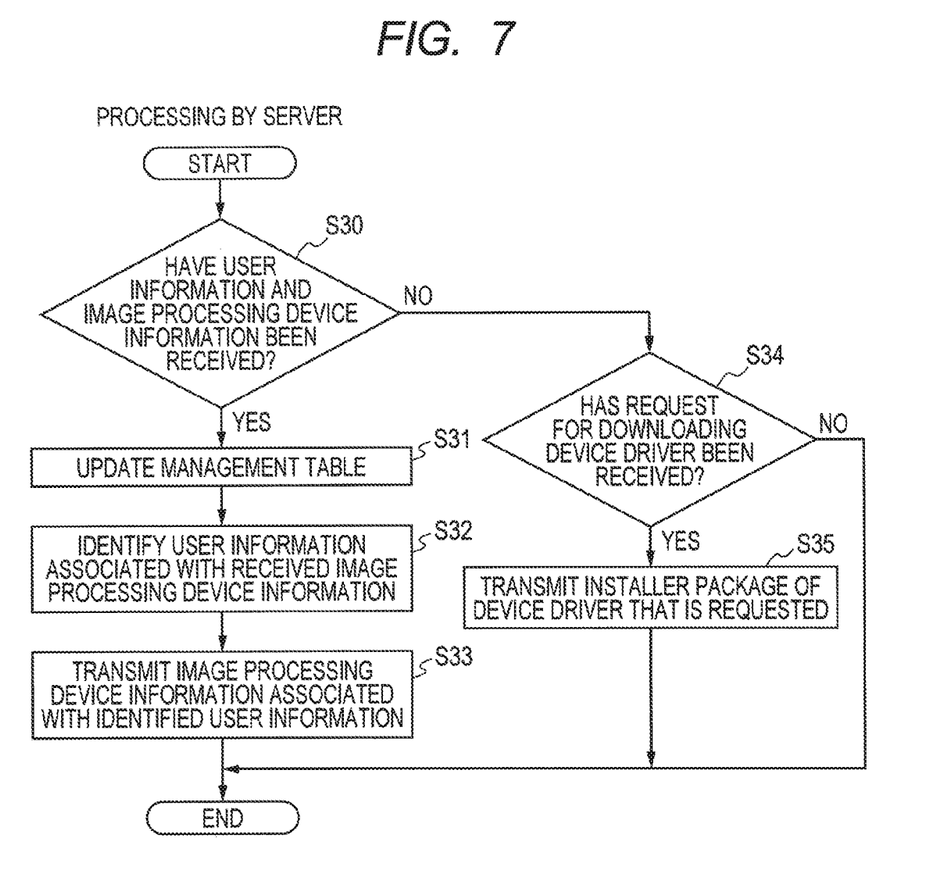
FIG. 7 is a flowchart showing the flow of processing executed by the server 20 shown in FIG. 1.

The server 20 determines whether the user information and the image processing device information transmitted from the information processing apparatus 1 in S3 (FIG. 5) have been received (S30 in FIG. 7). In response to determining that the user information and the image processing device information have been received (S30: Yes), the server 20 stores (registers) the received user information and image processing device information in the management table 21 (FIGS. 2A and 2B) to update the management table 21 (S31). Subsequently, the server 20 identifies user information associated with the received image processing device information (S32), and transmits image processing device information associated with the identified user information to the information processing apparatus 1 (S33). For example, in a case where the management table 21 has contents shown in FIG. 2A, the received user information is "YAMADA", and the image processing device information is the model name "MFP-A", the server 20 identifies the user IDs "YAMADA" and "SUZUKI" associated with the model name "MFP-A" (S32). Then, the server 20 transmits the model name "MFP-A" associated with "YAMADA" and the model name "MFP-C" associated with "SUZUKI" to the information processing apparatus 1 (S33, see FIG. 3A).

The controller 3 determines whether image processing device information has been received from the server 20 (S4 in FIG. 5). In response to determining that image processing device information has been received from the server 20 (S4: Yes), the controller 3 determines whether the image processing device identified by the received image processing device information has a print function (S5). In response to determining that the image processing device has a print function (S5: Yes), the controller 3 determines whether the device driver for that image processing device is installed on the information processing apparatus 1 (S6). That is, the controller 3 determines whether the device driver for controlling the image processing device that may become the target of an execution instruction of print processing by the image processing program 13 is installed on the information processing apparatus 1, among the plurality of image processing devices that communicates with the information processing apparatus 1 through the LAN network L. Specifically, the controller 3 determines whether the device driver for controlling the image processing device selected as the target of the execution instruction of image processing in the image processing program 13 is installed on the information processing apparatus 1, as the device driver for controlling the image processing device that may become the target of the execution instruction of image processing by the image processing program 13. As described above, the controller 3 determines whether the device driver is installed when a particular image processing device is selected in the image processing program 13. In response to determining that the device driver is not installed (S6: No), the controller 3 transmits, to the server 20, a request for downloading the device driver that is not installed (S7).

In response to determining that the user information and the image processing device information have not been received (S30: No in FIG. 7), the server 20 determines whether a request for downloading the device driver has been received (S34). In response to determining that the request for downloading the device driver has been received (S34: Yes), the server 20 transmits an installer package of the requested device driver to the information processing apparatus 1 that has transmitted the request for downloading the device driver (S35). For example, in response to receiving the request for downloading the printer drivers of the model names "MFP-A" and "MFP-C" from the information processing apparatus 1, the server 20 transmits, to the information processing apparatus 1, installer packages for the printer driver "MFP-A-DR" of the model name "MFP-A" and the printer driver "MFP-C-DR" of the model name "MFP-C" (S35).

The controller 3 downloads the installer package of the device driver transmitted from the server 20, and executes installation (S8 in FIG. 5). Specifically, the controller 3 downloads the installer package of the device driver transmitted from the server 20, and executes the execution file included in the installer package to install the device driver included in the installer package (S8). That is, in response to determining that the device driver is not installed on the information processing apparatus 1, the controller 3 executes installation processing of installing the device driver on the information processing apparatus 1. With this operation, printing can be performed by the image processing device corresponding to the installed device driver.

For example, in a case where installer packages for the printer driver "MFP-A-DR" of the model name "MFP-A" and the printer driver "MFP-C-DR" of the model name "MFP-C" have been downloaded from the server 20, the controller 3 executes the execution files included in the installer packages to install the printer driver "MFP-A-DR" and the printer driver "MFP-C-DR" included in the installer packages in the information processing apparatus 1 (S8). With this operation, printing can be performed by the printer A of the model name "MFP-A" and the printer C of the model name "MFP-C" (FIG. 1). Note that, even when the printer driver is being installed by the installation processing in S8, the user can select a print function or a scan function. That is, the installation processing and the processing shown in FIG. 5 can be executed in parallel.

In response to determining that the image processing device information has not been received from the server (S4: No), in response to determining that the image processing device does not have a print function (S5: No), or in response to determining that the device driver is installed (S6: Yes), the controller 3 does not transmit a request for downloading the device driver to the server 20 (S7) nor performs downloading and installation of the device driver from the server (S8).

That is, in a case where the selected image processing device performs image processing through a device driver, the controller 3 determines whether the device driver is installed on the information processing apparatus 1. In a case where the selected image processing device performs image processing not through a device driver, the controller 3 does not determine whether the device driver is installed on the information processing apparatus 1.

In a case where there is no operation to change the selected image processing device to another image processing device (S9: No), the controller 3 determines whether there is an operation to select a print function (S10). In response to determining that there is an operation to select a print function (S10: Yes), the controller 3 executes print processing (S11). For example, when the user select the icon P1 (FIG. 4B) displayed on the UI, the controller 3 determines that there is an operation to select a print function (S10: Yes), and executes print processing (S11).

The print processing will be described while referring to FIG. 6.

The controller 3 reads out the printer driver corresponding to the image processing device selected in S2 (FIG. 5) that is executed previously (S20 in FIG. 6), and determines whether the printer driver has been read out (S21). In a case where installation processing has been started in S8 but installation has not been completed yet, a negative determination is made in S21. In response to determining that the printer driver cannot be read out (S21: No), the controller 3 controls the display 7 to display a message that the printer driver is currently being installed until installation of the printer driver is completed, and continue downloading and installation of the printer driver (S22). In response to determining that the printer driver has been read out, that is, installation of the printer driver is completed (S21: Yes), the controller 3 controls the display 7 to display a selection screen for selecting a file to be printed, thereby allowing the user to select the file (S23). Then, the controller 3 performs print setting such as a print region, the number of printed sheets, and print quality that are selected by the user (S24), and transmits print data corresponding to file data selected in S23 and setting data indicative of the print setting set in S24 to the printer driver that is read out in S20 (S25). The printer driver transmits a print instruction to the image processing device through the network, based on the print data and setting data transmitted by the image processing program 13.

That is, the controller 3 transmits an execution instruction of print processing, through the installed device driver, to the image processing device that is controlled by the device driver installed on the information processing apparatus 1, the image processing device being selected in the image processing program 13.

In response to determining that there is no operation to select a print function (S10: No in FIG. 5), the controller 3 determines whether there is an operation to select a scan function (S12). In response to determining that there is an operation to select the scan function (S12: Yes), the controller 3 executes the scan processing (S13). For example, when the user selects the icon P2 (FIG. 4B) displayed on the UI, the controller 3 determines that there is an operation to select the scan function (S12: Yes), and executes the scan processing (S13). For example, in the scan processing, the controller 3 transmits, to the image processing device, an instruction for starting scan including information indicative of setting contents such as the type of a document, a color mode, a document size, and a resolution that are set by the user, and stores scan data received from the image processing device in a storage place set by the user. This processing does not include processing dependent on the model of the image processing device. Thus, for example, in a case where the printer A (MFP-A) is selected, it is unnecessary to install a scanner driver corresponding to MFP-A.

In response to determining that there is no operation to select the scan function (S12: No), the controller 3 executes other processing other than the print processing and the scan processing (S14). Upon ending the processing in S8, S11, S13, or S14, the processing returns to S1 and the processing in FIG. 5 is executed while the image processing program 13 is running.

As described above, the image processing program 13 installed on the information processing apparatus 1 having the controller 3 causes the controller 3 to perform: determination processing of determining whether the printer driver for controlling the printer that may become the target of an execution instruction of print processing by the image processing program 13 is installed on the information processing apparatus 1, among the plurality of printers configured to communicate with the information processing apparatus 1 through the LAN network L (S6); installation processing of, in response to determining in the determination processing that the printer driver is not installed on the information processing apparatus 1, installing the printer driver on the information processing apparatus 1 (S8); and execution instruction processing of transmitting an execution instruction of print processing, through the installed device driver, to the printer that is controlled by the printer driver that is installed on the information processing apparatus 1 by the installation processing, the printer being selected in the image processing program 13 (S11).

Further, as described above, the information processing apparatus 1 of this embodiment causes the printer to perform print processing by using the installed image processing program 13. The information processing apparatus 1 is configured to perform: determination processing of determining whether the printer driver for controlling the printer that may become the target of an execution instruction of print processing by the image processing program 13 is installed on the information processing apparatus 1, among the plurality of printers configured to communicate with the information processing apparatus 1 through the LAN network L (S6); installation processing of, in response to determining in the determination processing that the printer driver is not installed on the information processing apparatus 1, installing the printer driver on the information processing apparatus 1 (S8); and execution instruction processing of transmitting an execution instruction of print processing, through the installed printer driver, to the printer that is controlled by the printer driver that is installed on the information processing apparatus 1 by the installation processing, the printer being selected in the image processing program 13 (S11).

Effects of Embodiment (1) According to the above-described embodiment, the user of the information processing apparatus can automatically download, from the server 20, the printer driver of the printer that may become the target of a print instruction and automatically install the printer driver on the information processing apparatus, and causes the printer to perform printing through the installed printer driver. That is, an execution instruction of image processing can be appropriately transmitted to the image processing device selected in the image processing program.

That is, the user of the information processing apparatus does not need to perform work of manually downloading the printer driver from the server 20, installing the printer driver on the information processing apparatus, and instructing the printer to perform printing through the installed printer driver, which can reduces the work load on the user.

(2) Further, according to the above-described embodiment, the printer driver of the printer that is likely to become the target of an execution instruction for print processing by the image processing program 13 is installed. In other words, the printer driver of the printer that is unlikely to become the target of an execution instruction for print processing by the image processing program 13 is not installed. Thus, the controller 3 does not execute unnecessary processing when installing the printer driver.

(3) According to the above-described embodiment, in a case where the image processing device information transmitted to the server 20 by the user of the information processing apparatus 1 is associated with the user ID of the user of the information processing apparatus 30 in the management table 21 of the server 20, it is presumed that the user of the information processing apparatus 1 and the user of the information processing apparatus 30 are located closely with each other (that is, in the same area). Thus, it is presumed that the printer that is used by the user of the information processing apparatus 30 is likely to be used by the user of the information processing apparatus 1. Hence, the information processing apparatus 1 downloads, from the server 20, the printer driver of the printer used by the user of the information processing apparatus 30 as well as the printer driver for which the user has requested downloading, and installs the both printer drivers. With this operation, the user of the information processing apparatus 1 can use the printer that is used by the user of the information processing apparatus 30.

(4) According to the above-described embodiment, in a case where the information processing apparatus that is used is changed, the user of the information processing apparatus can automatically install the printer driver of the printer that was used in the old information processing apparatus only by setting his or her user ID to the new information processing apparatus and selecting the printer he or she wishes to use. Thus, the same printer environment as the old information processing apparatus can be created.

(5) That is, according to the above-described embodiment, in a case where the user of the information processing apparatus configured to communicate with a plurality of image processing devices through the LAN network L transmits an execution instruction of image processing to the selected image processing device but the device driver for controlling the image processing device is not installed on the information processing apparatus, the device driver can be automatically installed on the information processing apparatus and the image processing device can be caused to perform image processing through the installed device driver.

Modification

While the disclosure has been described in detail with reference to the above aspects thereof, it would be apparent to those skilled in the art that various changes and modifications may be made therein without departing from the scope of the claims.

(1) In the examples shown in FIGS. 3A and 3B, the server 20 identifies the user information (the user ID) associated with the image processing device information (the model name) transmitted from the information processing apparatus. Alternatively, the server 20 may identify the image processing device information associated with the user information transmitted from the information processing apparatus. For example, in a case where the information processing apparatus transmits the user ID "YAMADA" to the server 20 in the example of FIG. 3A, the server 20 identifies the model name "MFP-A" associated with "YAMADA" in the management table 21, and further identifies the model name "MFP-C" associated with the user ID "SUZUKI" associated with the model name "MFP-A". Further, it may be determined whether to install the device driver of the image processing device, without performing communication with the server 20 (more specifically without executing S3 or S4 in FIG. 5). For example, in a case where the image processing device is selected on the information processing apparatus and the device driver of the selected image processing device is not installed on the information processing apparatus, installation processing may be started. That is, only the device driver for the requested image processing device may be downloaded. Further, the device driver may be downloaded from a Web server on the Internet, for example, instead of downloading from the server 20.

(2) Further, determination of whether there is a device driver to be installed may be performed at timing other than the timing when the image processing device is selected. Such determination may be performed at particular timing such as the timing when the image processing program 13 is started up and the timing when the print function is selected. Further, the image processing device information for identifying the image processing device corresponding to the device driver to be installed is not limited to the image processing device selected by the user. For example, the image processing program 13 has a function of grouping a series of works so as to execute by one click (hereinafter, referred to as "workflow function"). Such workflow function includes information on an image processing device that is used for executing the series of work. The information included in the workflow function can be used by the image processing program of another information processing apparatus by storing, in a particular storage area of another information processing apparatus different from the information processing apparatus in which the workflow function is stored (registered). When a new workflow function is stored (registered) in the particular storage area, the device driver of the image processing device to be installed may be identified by using, as the key, the image processing device information included in the stored workflow function.

(3) The technique of this disclosure may be applied to an information processing program and an information processing apparatus for controlling an image processing device other than a printer, such as a scanner.

(4) The information processing program of this disclosure may be acquired from a storage medium such as a USB memory and a CD-ROM, instead of acquiring from the Web. Further, the information processing program of this disclosure may be acquired by communicating with another information processing apparatus in which the information processing program is stored.

What is claimed is:
1. A non-transitory computer-readable storage medium storing an image processing program including a set of program instructions executable on an information processing apparatus including a controller, the set of program instructions, when executed by the controller, causing the information processing apparatus to perform:
receiving a selection of an image processing device, the image processing device being among a plurality of image processing devices configured to communicate with the information processing apparatus through a network;

in response to receiving the selection of the image processing device, transmitting first image processing device information identifying the selected image processing device and user information identifying a user operating the image processing program to a server through the network, the server being configured to store a plurality of user information and a plurality of image processing device information in association with each other, the server being configured to identify all user information associated with the first image processing device information, the all user information including user information of another user other than the user operating the image processing program, identify, as second image processing device information, all image processing device information associated with the identified all user information, and to transmit the second image processing device information to the information processing apparatus;

receiving the second image processing device information from the server through the network;

determining whether a driver is installed on the information processing apparatus, the driver being for controlling the image processing device identified by the second image processing device information;

in response to determining that the driver is not installed on the information processing apparatus, installing the driver on the information processing apparatus; and transmitting an execution instruction for image processing through the installed driver to the image processing device that is controllable by the installed driver and that is selected in the image processing program.

2. The non-transitory computer-readable storage medium according to claim 1, wherein the determining comprises determining whether the driver is installed on the information processing apparatus when the image processing device is selected in the image processing program.

3. The non-transitory computer-readable storage medium according to claim 1, wherein the determining comprises determining whether the driver is installed on the information processing apparatus, the driver being for controlling the image processing device that is selected as the target of the execution instruction for image processing in the image processing program.

4. The non-transitory computer-readable storage medium according to claim 1, wherein the determining comprises:
  determining whether the driver is installed on the information processing apparatus in a case where the selected image processing device is configured to perform image processing by using the driver, without determining whether the driver is installed on the information processing apparatus in a case where the selected image processing device is configured to perform image processing without using the driver.

5. The non-transitory computer-readable storage medium according to claim 1, wherein the set of program instructions, when executed by the controller, causes the information processing apparatus to further perform:
  displaying, on a user interface screen, a button for searching for the image processing device connected to the network;
  in response to receiving an operation to the button, searching for the image processing device connected to the network and displaying image processing device information of the image processing device that is found; and
  in response to receiving a selection of the image processing device information, transmitting user information and the image processing device information to a server through the network, the user information identifying a user operating the image processing program.

6. An information processing apparatus configured to control an image processing device to perform image processing by using an installed image processing program, the information processing apparatus comprising:
  a controller; and
  a memory storing an image processing program including a set of program instructions, the program instructions, when executed by the controller, causing the information processing apparatus to perform:
  receiving a selection of the image processing device, the image processing device being among a plurality of image processing devices configured to communicate with the information processing apparatus through a network;
  in response to receiving the selection of the image processing device, transmitting first image processing device information identifying the selected image processing device and user information identifying a user operating the image processing program to a server through the network, the server being configured to store a plurality of user information and a plurality of image processing advice information in association with each other, the server being configured to identify all user information associated with the first image processing device information, the all user information including user information of another user other than the user operating the image processing program, identify, as second image processing device information, all image processing device information associated with the identified all user information, and to transmit the second image processing device information to the information processing apparatus;
  receiving the second image processing device information from the server through the network;
  determining whether a driver is installed on the information processing apparatus, the driver being for controlling the image processing device identified by the second image processing device information;
  in response to determining that the driver is not installed on the information processing apparatus, installing the driver on the information processing apparatus; and
  transmitting an execution instruction for image processing through the installed driver to the image processing device that is controllable by the installed driver and that is selected in the image processing program.

7. The information processing apparatus according to claim 6, wherein the determining comprises determining whether the driver is installed on the information processing apparatus when the image processing device is selected in the image processing program.

8. The information processing apparatus according to claim 6, wherein the determining comprises determining whether the driver is installed on the information processing apparatus, the driver being for controlling the image processing device that is selected as the target of the execution instruction for image processing in the image processing program.

9. The information processing apparatus according to claim 6, wherein the determining comprises:

determining whether the driver is installed on the information processing apparatus in a case where the selected image processing device is configured to perform image processing by using the driver, without determining whether the driver is installed on the information processing apparatus in a case where the selected image processing device is configured to perform image processing without using the driver.

10. The information processing apparatus according to claim 6, further comprising a display configured to display a user interface screen,
   wherein the set of program instructions, when executed by the controller, causes the information processing apparatus to further perform;
   displaying, on the user interface screen, a button for searching for the image processing device connected to the network;
   in response to receiving an operation to the button, searching for the image processing device connected to the network and displaying image processing device information of the image processing device that is found; and
   in response to receiving a selection of the image processing device information, transmitting user information and the image processing device information to a server through the network, the user information identifying a user operating the image processing program.

11. A system including an information processing apparatus and a server connected through a network, the information processing apparatus being configured to control an image processing device to perform image processing by using an installed image processing program,
   the information processing apparatus being configured to perform:
   receiving a selection of the image processing device, the image processing device being among a plurality of image processing devices configured to communicate with the information processing apparatus through a network;
   in response to receiving the selection of the image processing device, transmitting first image processing device information identifying the selected image processing device and user information identifying a user operating the image processing program to a server through the network,
   the server being configured to store a plurality of user information and a plurality of image processing device information in association with each other, the server being configured to identify all user information associated with the first image processing device information, the all user information including user information of another user other than the user operating the image processing program, identify, as second image processing device information, all image processing device information associated with the identified all user information, and to transmit the second image processing device information to the information processing apparatus,
   the information processing apparatus being configured to further perform:
   receiving the second image processing device information from the server through the network;
   determining whether a driver is installed on the information processing apparatus, the driver being for controlling the image processing device identified by the second image processing device information;
   in response to determining that the driver is not installed on the information processing apparatus, installing the driver on the information processing apparatus; and
   transmitting an execution instruction for image processing through the installed driver to the image processing device that is controllable by the installed driver and that is selected on the information processing apparatus.

* * * * *